US009723545B2

(12) United States Patent
Gix et al.

(10) Patent No.: US 9,723,545 B2
(45) Date of Patent: Aug. 1, 2017

(54) DISCOVERY OF WI-FI DIRECT SERVICES VIA DISCOVERY PROBE

(71) Applicant: QUALCOMM Incorporated, San Diego, CA (US)

(72) Inventors: Brian Gerard Gix, Seattle, WA (US); Mathew James Martineau, Seattle, WA (US); Peter David Krystad, Seattle, WA (US); Inga Stotland, Edmonds, WA (US); Shivraj Singh Sandhu, Milpitas, CA (US)

(73) Assignee: QUALCOMM Incorporated, San Diego, CA (US)

( * ) Notice: Subject to any disclaimer, the term of this patent is extended or adjusted under 35 U.S.C. 154(b) by 235 days.

(21) Appl. No.: 14/245,823

(22) Filed: Apr. 4, 2014

(65) Prior Publication Data
US 2015/0124792 A1    May 7, 2015

Related U.S. Application Data

(60) Provisional application No. 61/899,055, filed on Nov. 1, 2013.

(51) Int. Cl.
*H04W 8/00* (2009.01)
*H04W 48/16* (2009.01)
*H04W 76/02* (2009.01)
*H04L 29/08* (2006.01)
(Continued)

(52) U.S. Cl.
CPC ............. *H04W 48/16* (2013.01); *H04L 67/16* (2013.01); *H04W 4/008* (2013.01); *H04W 4/20* (2013.01); *H04W 8/005* (2013.01); *H04W 76/023* (2013.01)

(58) Field of Classification Search
CPC .... H04W 8/005; H04W 48/16; H04W 76/023
See application file for complete search history.

(56) References Cited

U.S. PATENT DOCUMENTS

| 7,856,508 | B2 | 12/2010 | Dowling |
| 8,170,481 | B2 | 5/2012 | Rangarajan et al. |
| 8,606,873 | B2 | 12/2013 | Park et al. |
(Continued)

FOREIGN PATENT DOCUMENTS

WO    WO-2013073914 A1    5/2013

OTHER PUBLICATIONS

ISA/EPO, International Search Report and Written Opinion of the International Searching Authority, Int'l App. No. PCT/US2014/061540, Mar. 17, 2015, European Patent Office, Rijswijk, NL 13 pgs.

(Continued)

*Primary Examiner* — Hoon J Chung
(74) *Attorney, Agent, or Firm* — Holland and Hart LLP

(57) ABSTRACT

Methods, systems, and devices are described for Wi-Fi peer-to-peer (P2P) communications. A seeker user equipment (UE) may identify a desired service to be provided via Wi-Fi P2P communication. The seeker UE may broadcast a probe that identifies the desired service. An advertiser UE may receive the probe from the seeker UE. The probe identifies a desired service for the seeker UE that is to be provided via Wi-Fi P2P communication. The advertiser UE may transmit a probe response to the seeker UE only when it is determined that the advertiser UE is capable of providing the identified desired service.

39 Claims, 14 Drawing Sheets

(51) Int. Cl.
*H04W 4/00* (2009.01)
*H04W 4/20* (2009.01)

(56) References Cited

U.S. PATENT DOCUMENTS

| | | | |
|---|---|---|---|
| 2010/0235525 A1* | 9/2010 | McGuire | H04L 61/1511 709/228 |
| 2011/0060825 A1 | 3/2011 | Ooe et al. | |
| 2011/0149806 A1 | 6/2011 | Verma et al. | |
| 2011/0153773 A1 | 6/2011 | Vandwalle et al. | |
| 2011/0153789 A1* | 6/2011 | Vandwalle | H04W 8/005 709/221 |
| 2013/0091273 A1 | 4/2013 | Ly et al. | |
| 2013/0109313 A1 | 5/2013 | Kneckt et al. | |
| 2013/0231151 A1 | 9/2013 | Kneckt et al. | |
| 2014/0313936 A1 | 10/2014 | You et al. | |
| 2014/0372388 A1* | 12/2014 | Attaluri | G06F 17/3033 707/693 |

OTHER PUBLICATIONS

IPEA/EPO, Second Written Opinion of the International Preliminary Examining Authority, Int'l. App. No. PCT/US2014/061540, Nov. 20, 2015, European Patent Office, Munich, DE, 7 pgs.

\* cited by examiner

DISCOVERY OF WI-FI DIRECT SERVICES VIA DISCOVERY PROBE

CROSS REFERENCES

The present application for patent claims priority to U.S. Provisional Patent Application No. 61/899,055 by Gix et al., entitled "Discovery of Wi-Fi Direct Services Via Discovery Probe," filed Nov. 1, 2013, and assigned to the assignee hereof.

BACKGROUND

The following relates generally to wireless communication, and more specifically to Wi-Fi peer-to-peer (P2P) services. Wireless communications systems are widely deployed to provide various types of communication content such as voice, video, packet data, messaging, broadcast, and so on. These systems may be wireless local area network (WLAN), also known as Wi-Fi systems which utilize carrier sense multiple access with collision avoidance (CSMA/CA) mechanisms to access a wireless medium. These systems may also be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Generally, a peer-to-peer (P2P) network allows wireless devices to directly communicate with each other. Devices within range of each other may discover and communicate directly without involving central access points. Services may be provided from one device to another via Wi-Fi P2P connections.

Current Wi-Fi P2P implementations involve discovering other devices using a probe. The probe is a packet that generally includes an identification of the device sending the probe and information regarding the Wi-Fi P2P capabilities of the device sending the probe. The device that transmits the probe may be referred to as a seeker. The device(s) that provide services may be referred to as advertisers or offerers. The seeker broadcasts a probe (unaddressed) to devices, e.g., advertisers, within range of the broadcast receive the probe. Each of the advertisers sends a probe response to the seeker using the identification of the seeker included in the probe (addressed). Each probe response includes an identification of the device sending the probe response and information regarding the Wi-Fi P2P capabilities of the device sending the probe response.

Upon receiving the probe responses, the seeker is then required to sort through the responses (results of the discovery search) to find valid matches for the Wi-Fi P2P capabilities of the seeker. This may be accomplished by the seeker displaying a list of advertisers for a user to sort through. Further, the sorting may involve sending a directed (addressed) query to each individual advertiser from which the seeker received a probe response. When the seeker is looking for specific services from another device via Wi-Fi P2P communication, the seeker may send a query to individual devices that responded to the discovery probe. The query may be a service search request. Each advertiser that receives the query may respond to inform the seeker of the specific service(s) that the respective advertiser is capable of providing. Querying each discovered advertiser, however, consumes time and resources.

SUMMARY

The described features generally relate to improved systems, methods, and/or apparatuses for improving service discovery for Wi-Fi P2P communications. In general, a seeker broadcasts a probe that identifies one or more desired services. Probe responses may then be sent only by devices that are capable of providing the desired service(s). This may limit the number of probe responses the seeker may receive, and thus limit the number of responses to sort through. Further, this approach may reduce the possibility of overlapping probe responses (e.g., collisions between responses) and/or the possibility of losing one or more probe responses in the noise that may be generated by hundreds or even thousands of probe responses being sent to the seeker. Further still, this approach may reduce the time involved in establishing a Wi-Fi P2P connection between the seeker and a respective advertiser to obtain the desired service(s).

In some embodiments, the probe may include a hash of a name of each desired service. This may facilitate identification of the desired service(s) in the probe, which has a limited available payload and is broadcast at a relatively low data rate (generally the lowest available) according to current Wi-Fi P2P implementations. Each of the probe responses may include the name(s) of the service(s) that the respective advertiser is capable of providing and that "match" the service(s) desired by the seeker. This may help to mitigate invalid matches that may result from overlapping (duplicate) hashes of different names of services.

A method for Wi-Fi peer-to-peer (P2P) communication is described. In one configuration, the method may involve identifying a desired service for a first device, the desired service to be provided via Wi-Fi P2P communication. The method may further involve broadcasting a probe that identifies the desired service.

In some embodiments, the method may involve including an identifier of the desired service in the probe to identify the desired service. The identifier of the desired service may be included in an information element (IE) of the probe. The identifier of the desired service may be a name of the desired service.

In some embodiments, the method may involve including a hash of an identifier of the desired service in the probe to identify the desired service. The hash of the identifier of the desired service may be included in an information element (IE) of the probe. The identifier of the desired service may be a name of the desired service. In some embodiments, the method may involve generating the hash of the identifier. In such embodiments, the method may involve determining a size of the hash to generate based at least in part on available payload of the probe.

In some embodiments, the method may involve receiving a probe response from at least one second device. Each probe response may include an identifier of a service that the at least one second device is capable of providing. In such embodiments, the method may involve determining if the identifier of the service matches an identifier of the desired service. The identifier of the service may be included in an information element (IE) of the probe response. The identifier of the service may be a name of the service.

In some embodiments, the method may involve providing a notification of a match when it is determined that the identifier of the service matches the identifier of the desired service. In such embodiments, providing the notification may include providing the notification to a user via a user interface of the first device. Alternatively or additionally, providing the notification may include providing the notification to the first device via an application. Further, the provided notification may include information regarding the at least one second device.

An apparatus for Wi-Fi peer-to-peer (P2P) communication is described. In one configuration, the apparatus may include means for identifying a desired service for a first device, the desired service to be provided via P2P communication. The apparatus also may include means for broadcasting a probe that identifies the desired service. Further, the apparatus may include means configured to perform one or more of the additional functions of the methods described above and as described further herein.

A user equipment (UE) for Wi-Fi peer-to-peer (P2P) communication is described. In one configuration, the UE may include: at least one processor; a memory in electronic communication with the at least one processor; and, instructions stored in the memory. The instructions may be executable by the at least one processor to: identify a desired service to be provided via P2P communication; and, broadcast a probe that identifies the desired service. Further, the instructions may be executable to perform one or more of the additional functions of the methods described above and as described further herein.

A computer program product for Wi-Fi peer-to-peer (P2P) communication is described. The computer program product may be a non-transitory computer-readable medium storing instructions executable by a processor to: identify a desired service for a first device, the desired service to be provided via P2P communication; and, broadcast a probe that identifies the desired service. Further, the stored instructions may be executable by the processor to perform one or more of the additional functions of the methods described above and as described further herein.

Another method for Wi-Fi peer-to-peer (P2P) communication is described. In one configuration, the method may involve receiving a probe from a probing device at a second device. The probe may identify a desired service for the probing device that is to be provided via Wi-Fi P2P communication. In some embodiments, the method may involve transmitting a probe response to the probing device only when it is determined that the second device is capable of providing the identified desired service. Further, the method may involve performing one or more of the additional functions described herein.

In one embodiment, the received probe may include a hash for the desired service. The hash for the desired service may be compared to a hash for a service that the second device is capable of providing to determine whether the second device is capable of providing the desired service. The hash for the service that the second device is capable of providing may include a hash of an identifier of the service and the hash for the desired service comprises a hash of an identifier of the desired service. In some embodiments, the method may include generating the hash for the service that the second device is capable of providing, and storing the generated hash. In some embodiments, the identifier of the service that the second device is capable of providing may be a name of the service and the identifier of the desired service may be a name of the desired service.

Another apparatus for Wi-Fi peer-to-peer (P2P) communication is described. In some embodiments, the apparatus may include means for receiving a probe from a probing device at a second device. The probe may identify a desired service for the probing device that is to be provided via Wi-Fi P2P communication. The apparatus also may include means for transmitting a probe response to the probing device. Such means may be configured to transmit the probe response only when it is determined that the second device is capable of providing the identified desired service. Further, the apparatus may include means configured to perform one or more of the additional functions described herein.

Another user equipment (UE) for Wi-Fi peer-to-peer (P2P) communication is described. In some embodiments, the UE may include: at least one processor; a memory in electronic communication with the at least one processor; and, instructions stored in the memory. The instructions may be executable by the at least one processor to receive a probe from a probing device at the UE. The received probe may identify a desired service for the probing device that is to be provided via Wi-Fi P2P communication. The instructions also may be executable by the at least one processor to transmit a probe response to the probing device only when it is determined that the UE is capable of providing the identified desired service. Further, the instructions may be executable to perform one or more of the additional functions described herein.

Another computer program product for Wi-Fi peer-to-peer (P2P) communication is described. In some embodiments, the computer program product may be a non-transitory computer-readable medium storing instructions executable by a processor to receive a probe from a probing device at a second device. The probe may identify a desired service for the probing device that is to be provided via Wi-Fi P2P communication. The stored instructions also may be executable by the processor to transmit a probe response to the probing device only when it is determined that the second device is capable of providing the identified desired service. Further, the instructions may be executable to perform one or more of the additional functions described herein.

Further scope of the applicability of the described methods and apparatuses will become apparent from the following detailed description, claims, and drawings. The detailed description and specific examples are given by way of illustration only, since various changes and modifications within the scope of the description will become apparent to those skilled in the art.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Communications between a device and other devices via Wi-Fi peer-to-peer (P2P) connections may be performed to provide services to the device from the other device(s). In order to establish Wi-Fi P2P connections for such communications, the device (seeker) may broadcast a probe and receive a probe response(s) from the other device(s).

In one example, a seeker (e.g., a smartphone) may identify or otherwise determine services that the seeker desires to receive from another device (i.e., an advertiser) via Wi-Fi P2P communications. The seeker may broadcast a probe that identifies the desired service(s). The seeker may receive probe responses (or no responses), and may determine whether there is a valid match for the desired service(s) by comparing names of services included in the probe responses with the name(s) of the desired service(s). A notification of a match may be provided when there is a valid match, either to a user of the seeker via a user interface or to the seeker via an application. The provided notification may include information about the device(s) providing such probe response(s).

An advertiser within range of the broadcast may receive the probe from the seeker. The advertiser may determine whether it is capable of providing the service(s) desired by the seeker as identified in the probe. The advertiser may make the determination by comparing each desired service with the service(s) that the advertiser is capable of providing. For example, the probe may include an identifier for each desired service and the advertiser may have each of its services identified by a respective identifier to allow comparison of identifiers. Only if the advertiser determines that it is capable of providing at least one service corresponding to the desired service(s) (e.g., by determining a match of identifiers), the advertiser may send a probe response to the seeker. Otherwise the advertiser may not send a probe response.

The following description provides examples, and is not limiting of the scope, applicability, or configuration set forth in the claims. Changes may be made in the function and arrangement of elements discussed without departing from the scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Figure 1:
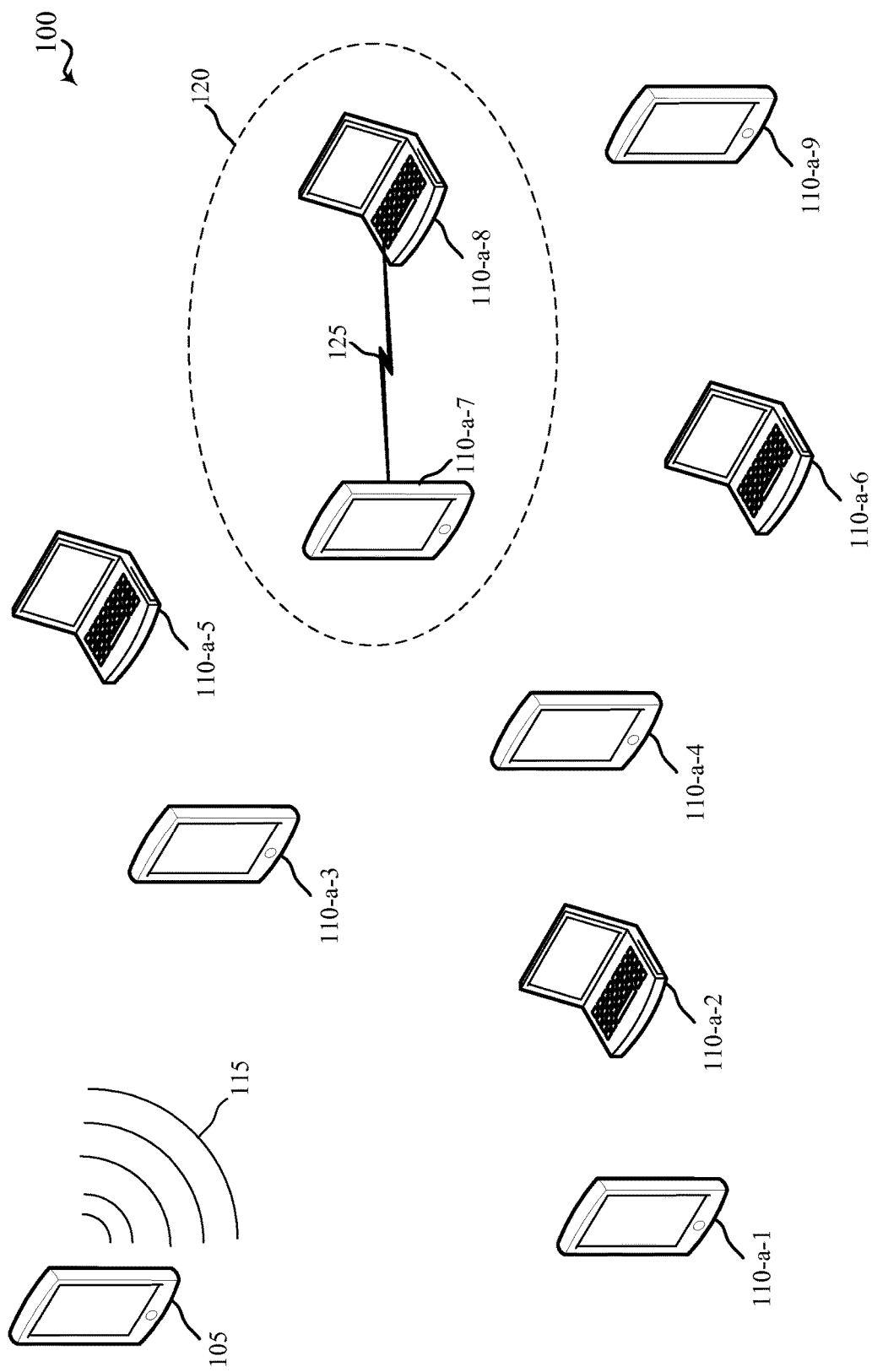
FIG. 1 shows a block diagram of a wireless communications system.

Referring first to FIG. 1, a system 100 includes various devices 105, 110 capable of Wi-Fi P2P communication. A seeker 105 and a plurality of advertisers 110-*a*-1-110-*a*-9 are depicted for the system 100. A P2P group 120 may exist in the system, which may comprise advertisers 110-*a*-7 and 110-*a*-8 that have established a Wi-Fi P2P connection or link 125. In this example, advertiser 110-*a*-7 may be the group owner. The seeker 105 may or may not already have Wi-Fi P2P connections established (and may or may not be part of a P2P group). However, for the sake of clarity no such Wi-Fi P2P connections are shown in FIG. 1 for the seeker 105. Examples of the devices 105, 110 may include, but are not limited to, smartphones, cell phones, tablets, personal digital assistants (PDAs), laptops, or any other devices capable of communicating via a Wi-Fi P2P connection.

In one embodiment, the seeker 105 may emit a broadcast 115 of a probe that identifies services desired to be provided via Wi-Fi P2P communication. Any of the advertisers 110 within range of the broadcast 115 may receive the probe. Upon receiving the probe, the advertiser 110-*a*-1 (as an example) may determine whether or not it is capable of providing the desired service(s) identified in the probe. If the advertiser 110-*a*-1 is not capable of providing at least one the desired service(s) identified in the probe, the advertiser 110-*a*-1 may do nothing in response to the received probe and may continue with whatever other operations it may be performing or return to an idle state.

The advertiser 110-*a*-1 may transmit a probe response addressed to the seeker 105 if the advertiser 110-*a*-1 is capable of providing at least one of the desired service(s) identified in the probe. The probe response may include the name(s) of the service(s) the advertiser 110-*a*-1 is capable of providing that are determined by the advertiser 110-*a*-1 to correspond to the desired service(s) identified in the probe. Upon receiving the probe response, the seeker 105 may determine whether or not the name(s) of the service(s) included in the probe response is/are a valid match(es) for the desired service(s). If valid, the seeker 105 may proceed to establish a Wi-Fi P2P connection with the advertiser 110-*a*-1 to obtain the desired service(s).

The Wi-Fi P2P connection may utilize a Wi-Fi P2P Peer link between two devices. This may also be referred to as a Wi-Fi Direct connection. In another example, the Wi-Fi connection may be established by using the Wi-Fi Tunneled Direct Link Setup (TDLS) link. The Wi-Fi devices in these examples may use the WLAN radio and baseband including physical and MAC layers from IEEE 802.11, and its various versions including, but not limited to, 802.11b, 802.11g, 802.11a, 802.11n, 802.11ac, 802.11ad, 802.11ah, etc.

The other advertisers 110 may follow the same procedure if they are within range to receive the broadcast 115 of the probe. With respect to advertiser 110-*a*-8, however, the advertiser 110-*a*-7 may be responsible for the services of the advertiser 110-*a*-8 as the owner of the group 120. Thus, the advertiser 110-*a*-7 may send a probe response to the seeker 105 if either it or the advertiser 110-*a*-8 is capable of providing the desired service(s).

Although not illustrated in FIG. 1, the seeker 105 may also operate as an advertiser if it is capable of providing services via Wi-Fi P2P communications. Further, each of the advertisers 110 may also operate as a seeker if it wants services to be provided via Wi-Fi P2P communications. The devices may be connected simultaneously or at different times depending on the capabilities of the devices and/or the system 100.

Figure 2:
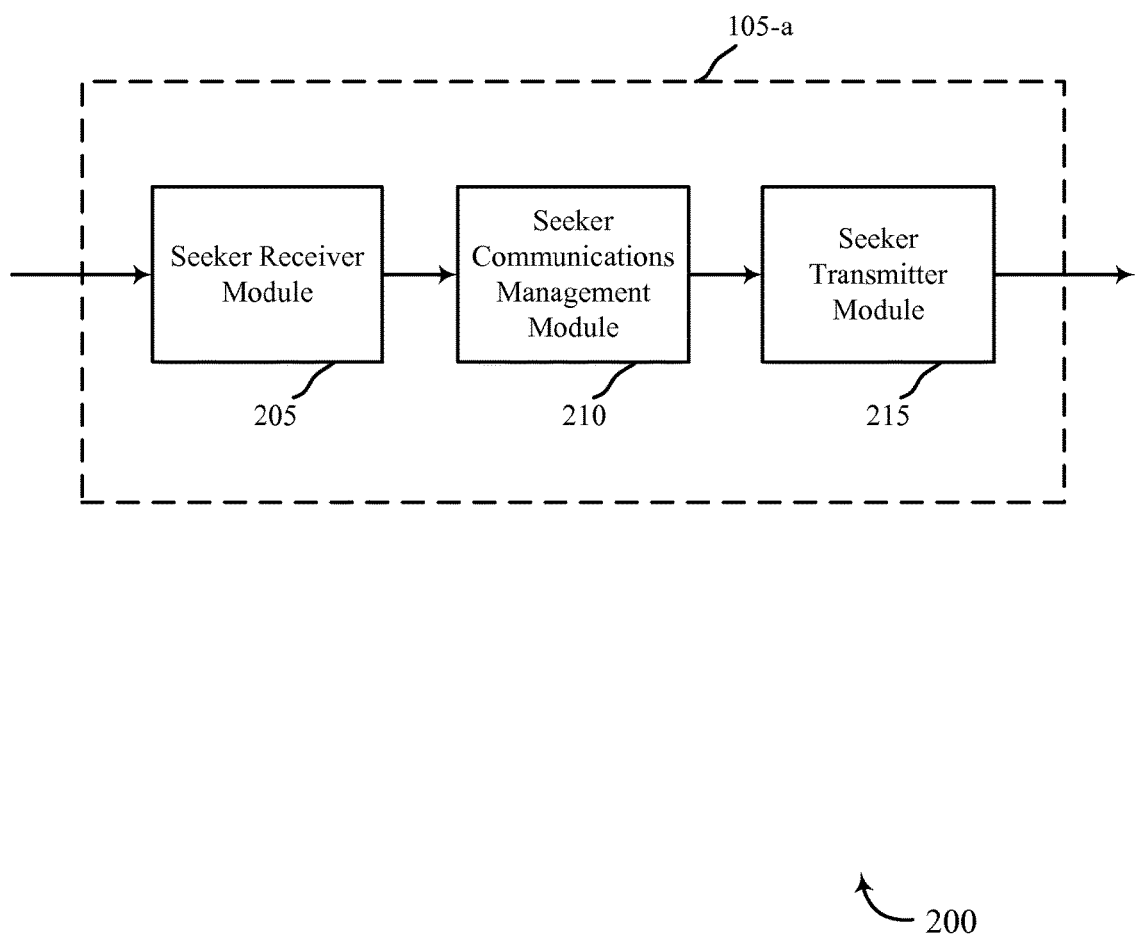
FIG. 2 is a block diagram illustrating a seeker in accordance with various embodiments.

Referring now to FIG. 2, a block diagram 200 illustrates a seeker 105-*a* in accordance with various embodiments. The seeker 105-*a* may be an example of one or more aspects of one of the seeker 105 described with reference to FIG. 1. The seeker 105-*a* may also be a processor. The seeker 105-*a* may include a seeker receiver module 205, a seeker communications management module 210, and a seeker transmitter module 215. Each of these components may be in communication with each other.

The components of the device 105-*a* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions stored in a memory, formatted to be executed by one or more general or application-specific processors.

The seeker transmitter module 215 may send communications from the seeker 105-*a* to other devices. Sending such communications may include broadcasting a probe as described herein. Further, the seeker transmitter module 215 may send communications by transmitting direct (addressed) communications to the device(s) once the seeker 105-*a* discovers the device(s). The seeker communications management module 210 may manage such communications sent by the seeker 105-*a*.

The seeker receiver module 205 may receive communications from other devices, such as the advertisers 110 described with reference to FIG. 1. As described herein, the communications may include probe responses from advertisers. The seeker receiver module 205 may receive these communications via directed (addressed) messages transmitted from advertisers. The seeker communications management module 210 may manage such communications received by the seeker 105-*a*. Additionally, the seeker communications management module 210 may manage communications transmitted from the seeker 105-*a* to advertisers. Further, the seeker communications management module 210 may establish Wi-Fi P2P connections and manage communications via such connections. Further details regarding the seeker communications management module 210 will be described below.

Figure 3A:
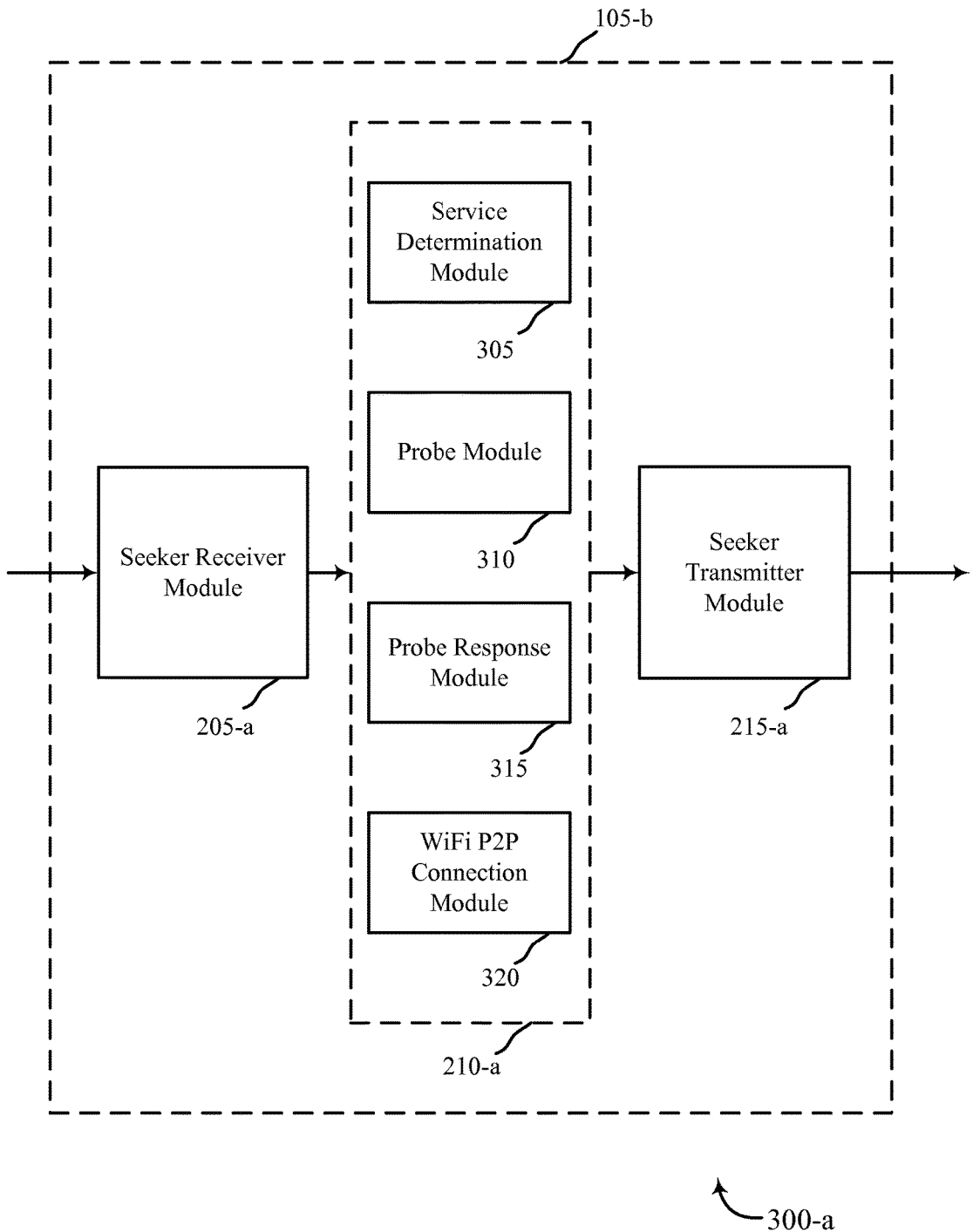
FIG. 3A is a block diagram illustrating another embodiment of the seeker.

FIG. 3A is a block diagram 300-*a* illustrating a seeker 105-*b* in accordance with various embodiments. The seeker 105-*b* may be an example of one or more aspects of one of the seeker 105 described with reference to FIGS. 1 and/or 2. The seeker 105-*b* may also be a processor. The seeker 105-*b* may include a seeker receiver module 205-*a*, a seeker communications management module 210-*a*, and a seeker transmitter module 215-*a*. Each of these components may be in communication with each other.

The components of the device 105-*b* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions stored in a memory, formatted to be executed by one or more general or application-specific processors.

The seeker receiver module 205-*a* and the seeker transmitter module 215-*a* may be configured as previously described with reference to FIG. 2. The seeker communications management module 210-*a* may include a service determination module 305, a probe module 310, a probe response module 315, and a Wi-Fi P2P connection module 320.

The seeker communications management module 210-*a* may be configured to perform the various functions described above with respect to FIG. 2. In this example, the seeker communications management module 210-*a* may manage a discovery process for services that the seeker 105-*b* desires to be provided via Wi-Fi P2P communication. The seeker 105-*b* or the seeker communications management module 210-*a* may include a processor for performing such functionality.

The service determination module 305 may identify or otherwise determine services that the seeker 105-*b* desires. For example, such identification/determination may be based on applications running on the seeker 105-*b*, which may use such services. Alternatively or additionally, the identification/determination of the desired service(s) may be based on an indication that the operating system of the seeker 105-*b* intends to use the desired service(s). Further, the desired service(s) may be identified/determined based on user input received by the seeker 105-*b* that indicates a function or operation desired by the user may employ the desired service(s).

The probe module 310 may generate a probe that identifies or otherwise indicates the desired service(s) determined by the service determination module 305. In some embodiments, the generated probe may identify the desired service(s) by name. Alternatively, the generated probe may indicate the desired service(s) using an identifier for each respective service. In some embodiments, each identifier may include a hash of the name of the respective service. The name(s), identifier(s) or hash(es) (e.g., hash value) may be included in an information element (IE) of the probe.

Once the probe is generated, the seeker transmitter module 215-*a* may broadcast the probe to discover any devices within range that are capable of providing the desired service(s). The seeker receiver module 205-*a* may receive probe responses, if any, sent from advertisers and may provide the probe responses to the probe response module 315. The probe response module 315 may process the responses as appropriate or desired to determine which, if any, of the advertisers is suitable for providing the desired service(s). For example, the probe response module 315 may sort through the probe responses to confirm the capabilities of the advertisers for Wi-Fi P2P communication and/or for providing the desired service(s) via information included in the respective probe responses. Alternatively, the probe response module 315 may confirm only the capabilities of the advertisers for providing the desired service(s), and confirming the Wi-Fi P2P communication capabilities may be performed by the Wi-Fi P2P connection module 320. When it is determined that one or more of the advertisers are capable of providing the desired service(s), the probe response module 315 may provide a notification of a "match" to a user of the seeker 105-*b* via a user interface (not shown). Alternatively or additionally, the probe response module 315 may provide the notification to the seeker 105-*b* (e.g., the Wi-Fi P2P connection module 320) via an application. In some embodiments, the notification may include information regarding the advertiser(s) capable of providing the desired service(s).

The Wi-Fi P2P connection module 320 may determine whether to establish a Wi-Fi P2P connection between the seeker 105-*b* and one or more of the advertisers that responded to the probe. The Wi-Fi P2P connection module 320 may also be configured to establish a respective Wi-Fi P2P connection with one or more of the advertisers. This may be performed through directed (addressed) communications between the seeker 105-*b* and the respective advertisers using the seeker receiver module 205-*a* and seeker transmitter module 215-*a*. Once a Wi-Fi P2P connection is established between the seeker 105-*b* and a respective advertiser, the advertiser may provide the seeker 105-*b* with the desired service(s) that it is capable of providing.

Figure 3B:
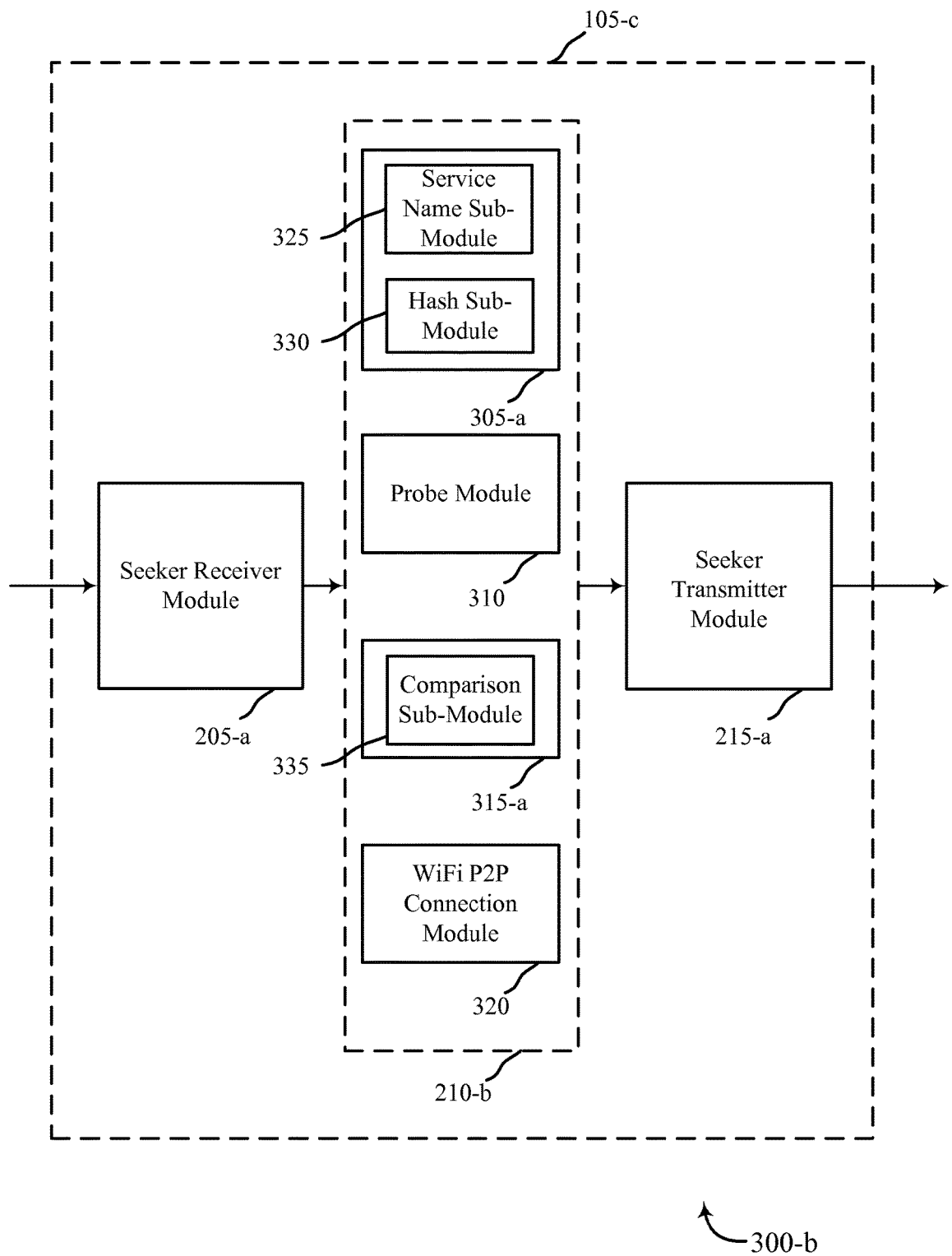
FIG. 3B is a block diagram illustrating a further embodiment of the seeker.

FIG. 3B is a block diagram 300-*b* illustrating a seeker 105-*c* in accordance with various embodiments. The seeker 105-*c* may be an example of one or more aspects of one of the seeker 105 described with reference to FIGS. 1, 2 and/or 3A. The seeker 105-*c* may also be a processor. The seeker 105-*c* may include a seeker receiver module 205-*a*, a seeker communications management module 210-*b*, and a seeker transmitter module 215-*a*. Each of these components may be in communication with each other.

The components of the device 105-*c* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions stored in a memory, formatted to be executed by one or more general or application-specific processors.

The seeker receiver module 205-*a* and the seeker transmitter module 215-*a* may be configured as previously described with reference to FIGS. 2 and/or 3A. The seeker communications management module 210-*b* may include a service determination module 305-*a*, a probe module 310, a probe response module 315-*a*, and a Wi-Fi P2P connection module 320. The probe module 310 and the Wi-Fi P2P connection module 320 may be configured as previously described with reference to FIGS. 2 and/or 3A, and may provide additional functionality as described below.

The seeker communications management module 210-*b* may be configured to perform the various functions described above with respect to FIGS. 2 and/or 3A. As above, the seeker communications management module 210-*b* may manage a discovery process for services that the seeker 105-*c* desires to be provided via Wi-Fi P2P communication. Further, the seeker 105-*c* or the seeker communications management module 210-*b* may include a processor for performing such functionality.

The service determination module 305-*a* may identify or otherwise determine services that the seeker 105-*c* desires, such as described above. In this example, the service determination module 305-*a* may include a service name sub-module 325 and a hash sub-module 330. The service name sub-module 325 may be configured to determine the name or string for each desired service. The hash sub-module 330 may then generate a hash of the name for each desired service. In some embodiments, the name(s) may be hashed using SH256. Use of a hash may enable the desired services to be identified in an efficient manner.

In this example, the probe module 310 may generate a probe that identifies the desired service(s) using the generated hash(es). As described above, the hash(es) may be included in an information element (IE) of the probe. Including the hash(es) in the probe, as opposed to the name(s) of the desired service(s) or some other identifier(s), may be desirable because of the limited available payload of the probe. In some embodiments, a size of the hash(es) to be generated may be determined using the available payload of the probe. The size of each hash may be from two to thirty-two octets, for example. As appropriate or desired, the size of the hash may be determined to help mitigate the possibility of different names yielding a same hash value. One example may be to use a hash of six octets.

Once the probe is generated, the seeker transmitter module 215-*a* may broadcast the probe to discover any devices within range that are capable of providing the desired service(s). The seeker receiver module 205-*a* may receive probe responses, if any, sent from advertisers and may provide the probe responses to the probe response module 315-*a*. The probe response module 315-*a* may process the responses as appropriate or desired to determine which, if any, of the advertisers is suitable for providing the desired service(s). As described above with reference to FIG. 3A, the probe response module 315-*a* may be configured to sort through the probe responses to confirm the capabilities of the advertisers for Wi-Fi P2P communication and/or for providing the desired service(s) via information included in the respective probe responses. For example, the information included in the probe responses may include the name(s) of the service(s) that the respective advertisers are capable of providing. The name(s) may be included in an information element (IE) of the probe response(s).

In this example, the probe response module 315-*a* may include a comparison sub-module 335 to confirm the capabilities of the advertisers for providing the desired service(s). The comparison sub-module 335 may compare the name(s) of the service(s), included in the probe response from each respective advertiser, to the name(s) of the desired service(s) identified/determined by the service determination module 305-*a*. Including the actual name(s)/string(s) in the probe response and comparing with the name(s)/string(s) of the desired service(s) may account for the possibility of different names yielding a same hash value.

As described above, the Wi-Fi P2P connection module 320 may determine whether to establish a Wi-Fi P2P connection between the seeker 105-*c* and one or more of the advertisers that responded to the probe. The Wi-Fi P2P connection module 320 may also be configured to establish a respective Wi-Fi P2P connection with one or more of the advertisers.

Figure 4:
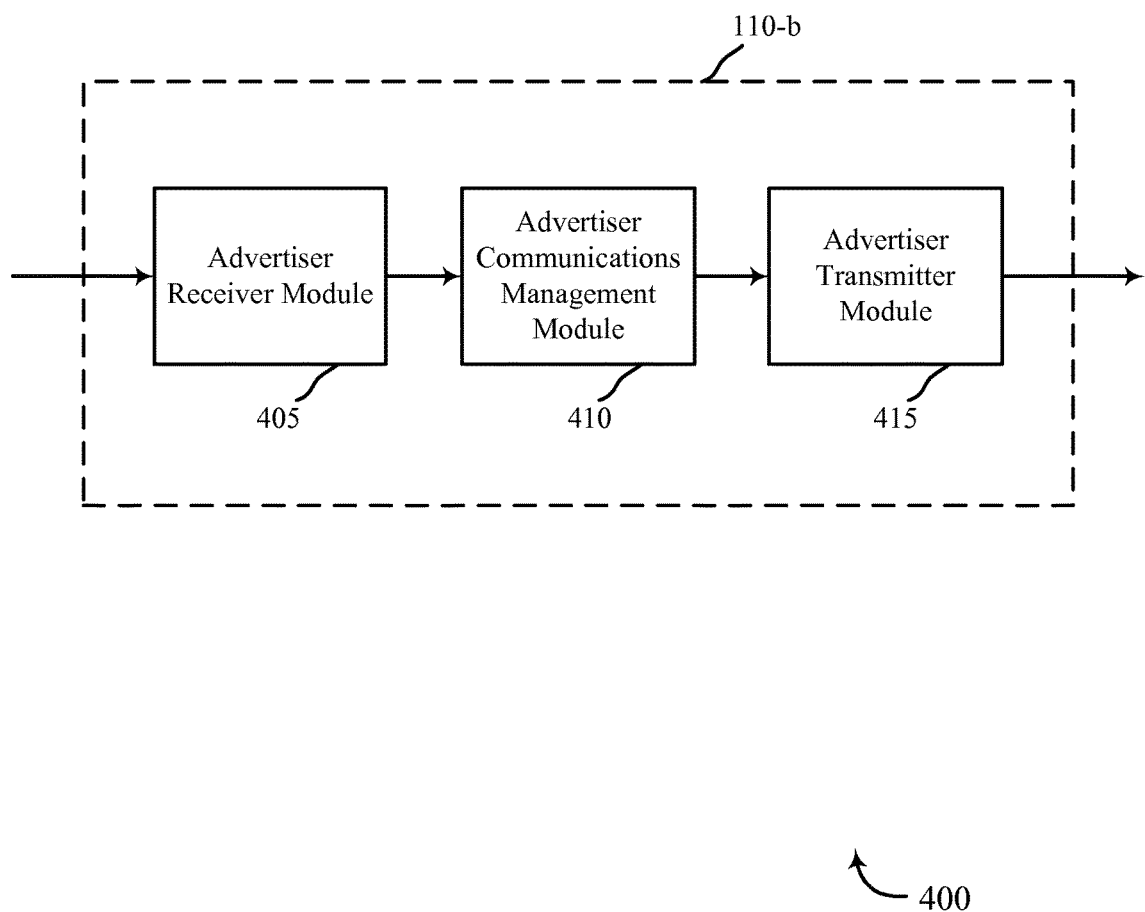
FIG. 4 is a block diagram illustrating an advertiser in accordance with various embodiments.

Referring now to FIG. 4, a block diagram 400 illustrates an advertiser 110-*b* in accordance with various embodiments. The advertiser 110-*b* may be an example of one or more aspects of one of the advertisers 110 described with reference to FIG. 1. The advertiser 110-*b* may also be a processor. The advertiser 110-*b* may include an advertiser receiver module 405, an advertiser communications management module 410, and an advertiser transmitter module 415. Each of these components may be in communication with each other.

The components of the device 110-b may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions stored in a memory, formatted to be executed by one or more general or application-specific processors.

The advertiser receiver module 405 may receive communications from other devices, such as the seeker 105 described with reference to FIGS. 1, 2, 3A and/or 3B. As described herein, the communications may include probes from seekers. The advertiser receiver module 405 may receive these communications via broadcasts from seekers. The advertiser communications management module 410 may manage such communications received by the advertiser 110-b.

The advertiser transmitter module 415 may send communications from the advertiser 110-b to other devices. Sending such communications may include direct (addressed) transmissions of probe responses as described herein. Further, the advertiser transmitter module 415 may send other communications by direct transmissions to the device(s) once the advertiser 110-b has requisite information about the device(s). The advertiser communications management module 410 may manage such communications sent by the advertiser 110-b. Further, the advertiser communications management module 410 may establish Wi-Fi P2P connections and manage communications via such connections. Further details regarding the advertiser communications management module 410 will be described below.

Figure 5A:
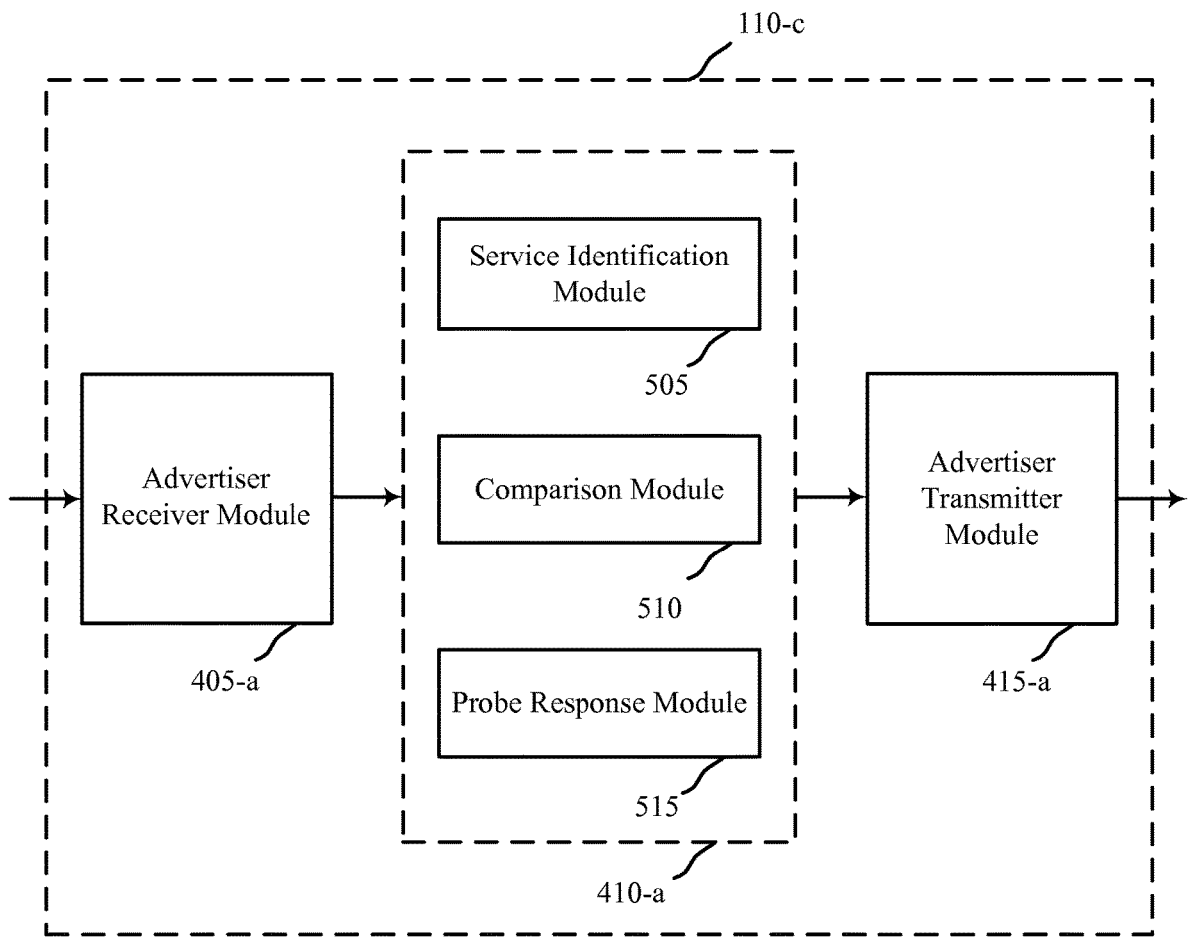
FIG. 5A is a block diagram illustrating another embodiment of the advertiser.

FIG. 5A is a block diagram 500-a illustrating an advertiser 110-c in accordance with various embodiments. The advertiser 110-c may be an example of one or more aspects of one of the advertisers 110 described with reference to FIGS. 1 and/or 4. The advertiser 110-c may also be a processor. The advertiser 110-c may include an advertiser receiver module 405-a, an advertiser communications management module 410-a, and an advertiser transmitter module 415-a. Each of these components may be in communication with each other.

The components of the device 110-c may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions stored in a memory, formatted to be executed by one or more general or application-specific processors.

The advertiser receiver module 405-a and the advertiser transmitter module 415-a may be configured as previously described with reference to FIG. 4. The advertiser communications management module 410-a may include a service identification module 505, a comparison module 510, and a probe response module 515.

The advertiser communications management module 410-a may be configured to perform the various functions described above with respect to FIG. 4. In this example, the advertiser communications management module 410-a may manage participation of the advertiser 110-c in a discovery process for services that the seeker 105 desires to be provided via Wi-Fi P2P communication. The advertiser 110-c or the advertiser communications management module 410-a may include a processor for performing such functionality.

The service identification module 505 may identify services that the advertiser 110-c is capable of providing. Such identification may be based on a list of the service(s) stored at the advertiser 110-c. The list may be generated when the advertiser 110-c is initially provisioned, and may be updated when the advertiser 110-c receives a software update and/or when the advertiser 110-c has a new application installed is configured to provide a service or services. The list may include the name(s) or identifier(s) of the service(s) that the advertiser 110-c is capable of providing.

As described above, the advertiser receiver module 405-a may receive probes that identify the service(s) desired by the respective seekers 105. The advertiser receiver module 405-a may provide the probes or the name(s)/identifier(s) included in the probe that identify the desired service(s) to the comparison module 510. The comparison module 510 may compare the name(s)/identifier(s) included in the probe with the list of name(s)/identifier(s) stored at the advertiser 110-c to determine whether the advertiser 110-c is capable of providing the desired service(s).

The probe response module 515 may generate a probe response that includes the name(s)/identifier(s) of the service(s) corresponding to the at least one desired service if the comparison module 510 determines that the advertiser 110-c is capable of providing at least one desired service. In some embodiments, it may be preferable to include the actual name(s) rather than the identifier(s) to facilitate a confirmation process performed by the seeker 105 for the service(s) to be provided, as described above for example. The name(s) or identifier(s) may be included in an information element (IE) of the probe response.

If the probe response is generated, the advertiser transmitter module 415-a may transmit the probe response to the seeker 105 to inform the seeker 105 of the service(s) that the advertiser 110-c may provide to address the desired service(s). Although not shown, the advertiser communications management module 410-a may include a Wi-Fi P2P connection module configured to cooperate with the Wi-Fi P2P connection module 320 described above with respect to FIGS. 3A and/or 3B to establish a Wi-Fi P2P connection between the advertiser 110-c and the seeker 105. Alternatively, the advertiser communications management module 410-a may provide suitable functionality to cooperate with the Wi-Fi P2P connection module 320 to establish the Wi-Fi P2P connection.

Figure 5B:
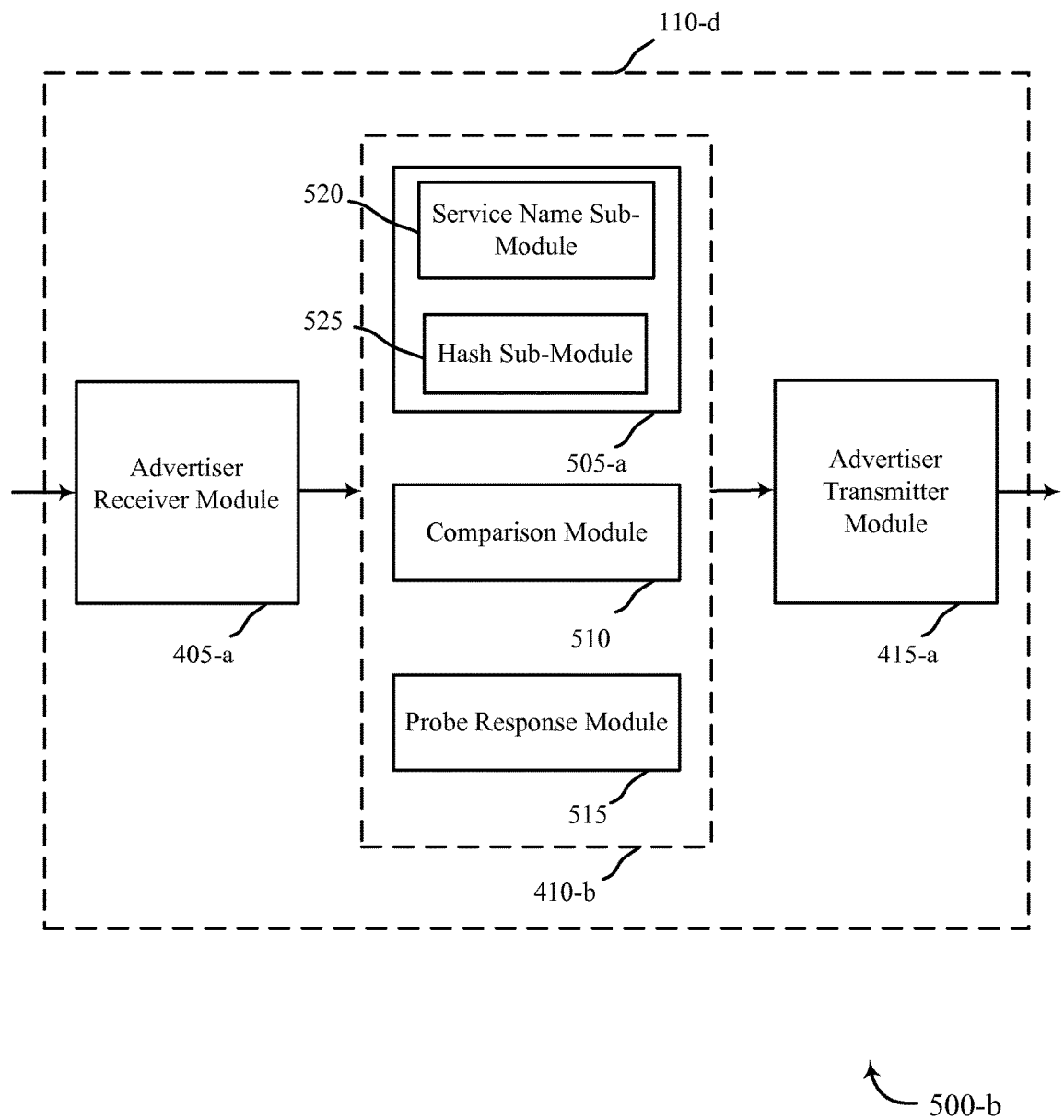
FIG. 5B is a block diagram illustrating a further embodiment of the advertiser.

FIG. 5B is a block diagram 500-b illustrating an advertiser 110-d in accordance with various embodiments. The advertiser 110-d may be an example of one or more aspects of one of the advertisers 110 described with reference to FIGS. 1, 4 and/or 5A. The advertiser 110-d may also be a processor. The advertiser 110-d may include an advertiser receiver module 405-a, an advertiser communications management module 410-b, and an advertiser transmitter module 415-a. Each of these components may be in communication with each other.

The components of the device 110-d may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions stored in a memory, formatted to be executed by one or more general or application-specific processors.

The advertiser receiver module 405-*a* and the advertiser transmitter module 415-*a* may be configured as previously described with reference to FIGS. 4 and/or 5A. The advertiser communications management module 410-*b* may include a service identification module 505-*a*, a comparison module 510, and a probe response module 515.

The advertiser communications management module 410-*b* may be configured to perform the various functions described above with respect to FIGS. 4 and/or 5A. In this example, the advertiser communications management module 410-*b* may manage participation of the advertiser 110-*d* in a discovery process for services that the seeker 105 desires to be provided via Wi-Fi P2P communication. The advertiser 110-*d* or the advertiser communications management module 410-*b* may include a processor for performing such functionality.

The service identification module 505-*a* may be configured to perform the various functions described above with respect to FIG. 5A. In this example, the service identification module 505-*a* may include a service name sub-module 520 and a hash sub-module 525. The service identification module 505-*a* may identify services that the advertiser 110-*d* is capable of providing as described above. As such, the service name sub-module 520 may maintain the list of the service(s) stored at the advertiser 110-*d*. The list may include the name(s) or identifier(s) of the service(s) that the advertiser 110-*d* is capable of providing. In this example, the hash sub-module 525 may hash the name(s) or identifier(s) of the service(s) in the list to obtain a corresponding list of hashes or hash values.

As described above, the advertiser receiver module 405-*a* may receive probes that identify the service(s) desired by the respective seekers 105. In this example, the service(s) desired by the respective seekers 105 may be identified by hashes of the name(s)/identifier(s) (e.g., hash values) of the desired services, as described above with respect to FIG. 3B. The advertiser receiver module 405-*a* may provide the probes or the hash(es) included in the probe that identify the desired service(s) to the comparison module 510. The comparison module 510 may compare the hash(es) included in the probe with the list of hashes stored at the advertiser 110-*d* to determine whether the advertiser 110-*d* is capable of providing the desired service(s).

As described above with respect to FIG. 5A, if the comparison module 510 determines that the advertiser 110-*d* is capable of providing at least one desired service, the probe response module 515 may generate a probe response that includes the name(s)/identifier(s) of the service(s) corresponding to the at least one desired service. Further, the advertiser transmitter module 415-*a* may transmit the probe response to the seeker 105 to inform the seeker 105 of the service(s) that the advertiser 110-*d* may provide to address the desired service(s). If the advertiser 110-*d* is not capable of providing at least one desired service, no probe response may be generated or sent.

Figure 6:
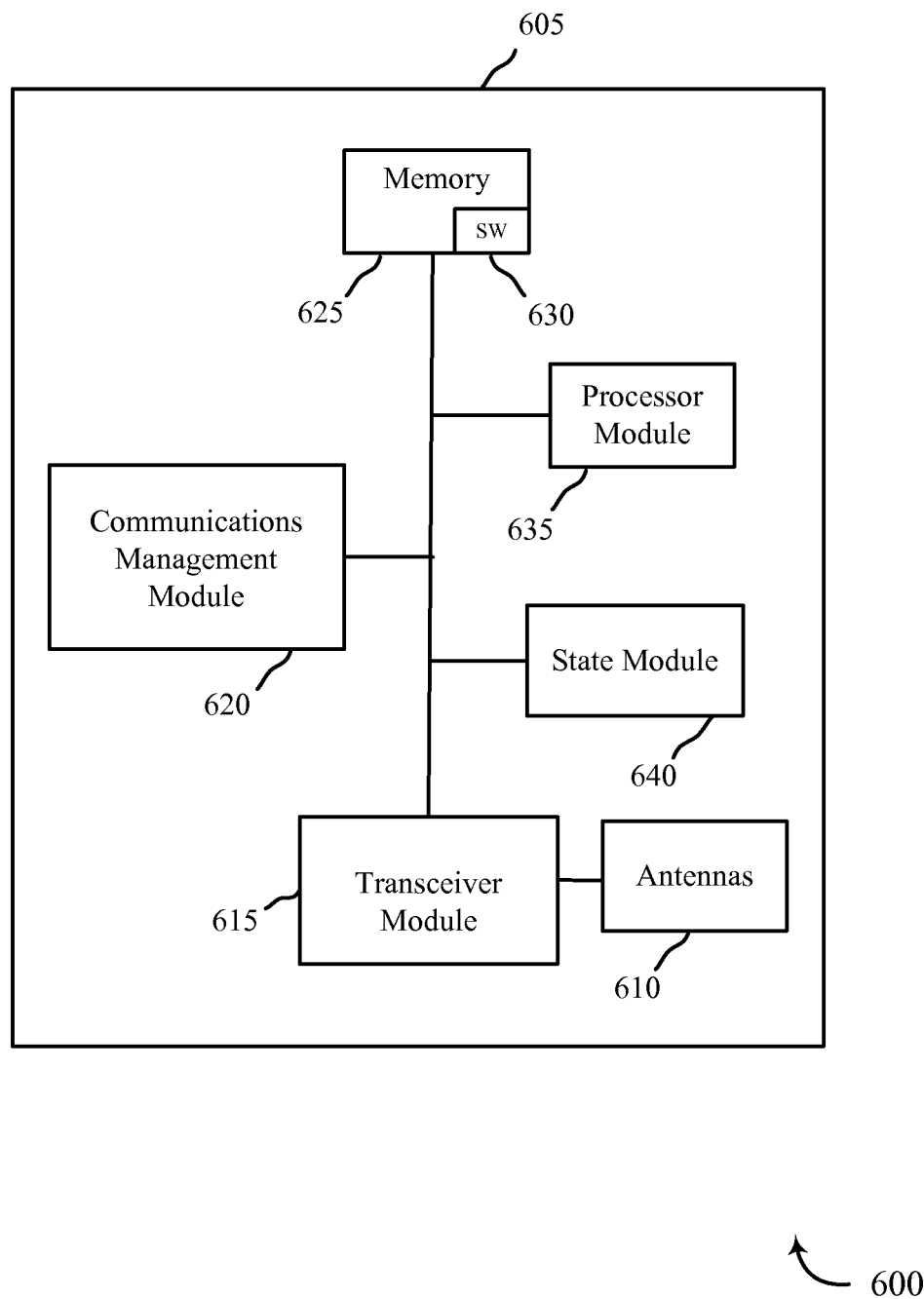
FIG. 6 is a block diagram of one configuration of a seeker/advertiser device.

FIG. 6 is a block diagram 600 illustrating a device 605 according to various embodiments. The device 605 may operate as either a seeker or as an advertiser as described herein, depending on actual use of the device 605. As a result, the device 605 may be configured to participate in a discovery process for obtaining desired services via Wi-Fi P2P communications with other wireless devices (e.g., via a Wi-Fi P2P connection). Thus, the device 605 may be the seeker 105 and/or the advertiser 110 of FIGS. 1, 2, 3A, 3B, 4, 5A and/or 5B, respectively. The device 605 may have any of various configurations, such as personal computers (e.g., laptop computers, netbook computers, tablet computers, etc.), cellular telephones, PDAs, digital video recorders (DVRs), internet appliances, gaming consoles, e-readers, etc. The device 605 may have an internal power supply (not shown), such as a small battery, to facilitate mobile operation.

In the configuration shown, the device 605 includes antennas 610, a transceiver module 615, a communications management module 620, memory 625, a processor module 635 and a state module 640, which each may be in communication, directly or indirectly, with each other (e.g., via one or more buses). The transceiver module 615 is configured to communicate bi-directionally, via the antennas 610, as described above. For example, the transceiver module 615 may be configured to communicate bi-directionally with other devices 105 and/or 110 of FIGS. 1, 2, 3A, 3B, 4, 5A and/or 5B. The transceiver module 615 may include the receiver module 205/405 and the transmitter module 215/415 of FIGS. 2, 3A, 3B, 4, 5A and/or 5B, as previously described. In one embodiment, the transceiver module 615 may further include a modem configured to modulate packets and provide the modulated packets to the antennas 610 for transmission, and to demodulate packets received from the antennas 610. While the device 605 may include a single antenna, the device 605 will typically include multiple antennas 610 for multiple links.

The memory 625 may include random access memory (RAM) and read-only memory (ROM). The memory 625 may store computer-readable, computer-executable software code 630 containing instructions that are configured to, when executed, cause the processor module 635 to perform various functions described herein (e.g., receive, transmit, compare, obtain, generate, etc.). Alternatively, the software 630 may not be directly executable by the processor module 635 but be configured to cause the computer (e.g., when compiled and executed) to perform functions described herein.

The processor module 635 may include an intelligent hardware device, e.g., a central processing unit (CPU), a microcontroller, an application specific integrated circuit (ASIC), etc. The processor module 635 may include a speech encoder (not shown) configured to receive audio via a microphone, convert the audio into packets (e.g., 30 ms in length) representative of the received audio, provide the audio packets to the transceiver module 615, and provide indications of whether a user is speaking. Alternatively, an encoder may only provide packets to the transceiver module 615, with the provision or withholding/suppression of the packet itself providing the indication of whether a user is speaking.

The communications management module 620 may be a component of the device 605 in communication with some or all of the other components of the device 605 via a bus. Alternatively, functionality of the communications management module 620 may be implemented as a component of the transceiver module 615, as a computer program product, and/or as one or more controller elements of the processor module 635. The communications management module 620 may be an example of one or more aspects of one of the seeker communications management modules 210 and/or the advertiser communications management modules 410 described with reference to FIGS. 2, 3A, 3B, 4, 5A and/or 5B. The state module 640 may reflect and control the current device state.

The components of the device 605 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors. Each of the noted modules may be a means for performing one or more functions related to operation of the device 605 as described herein.

Figure 7:
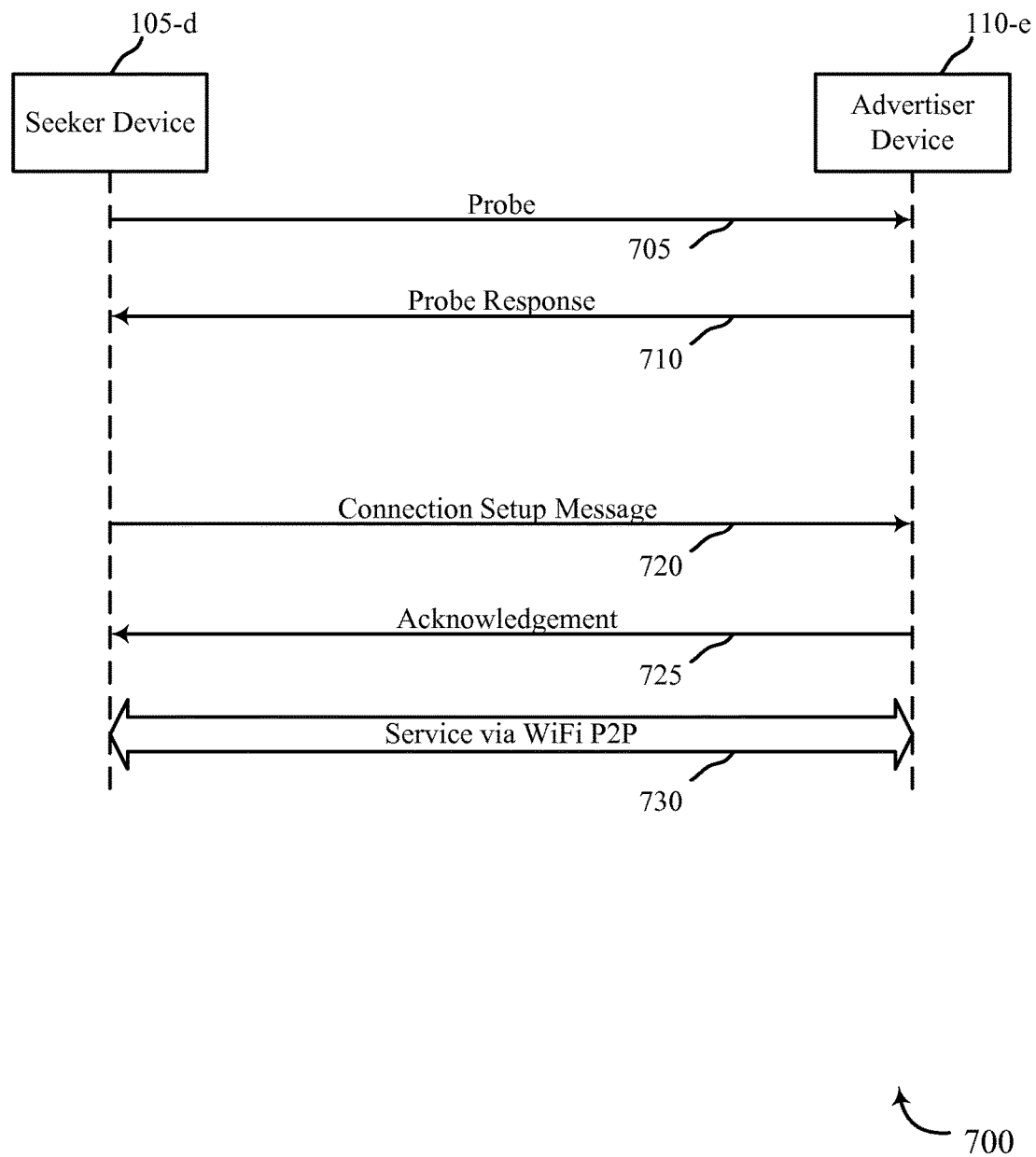
FIG. 7 is a message flow diagram illustrating a flow of communications between a seeker and an advertiser in accordance with various embodiments.

FIG. 7 is a message flow diagram 700 illustrating one example of communications between a seeker 105-*d* and an advertiser 110-*e*. The seeker 105-*d* may be an example of the device 105 of FIGS. 1, 2, 3A, 3B and/or 6. The advertiser 110-*e* may be an example of the device 110 illustrated in FIGS. 1, 4, 5A, 5B and/or 6.

In one configuration, the seeker 105-*d* and the advertiser 110-*e* may be connected via a Wi-Fi P2P connection. The seeker 105-*d* may broadcast a probe 705 for desired services that may be received by the advertiser 110-*e* when the advertiser 110-*e* is within range. The advertiser 110-*e* may transmit a probe response 710 to the seeker 105-*d* if the advertiser 110-*e* is capable of providing at least one of the desired service(s).

If the seeker 105-*d* determines that there is a match between the service(s) the advertiser 110-*e* is capable of providing and at least one service desired by the seeker 105-*d* (and included in the probe 705), the seeker 105-*d* may send a connection setup message 720 to the advertiser 110-*e* requesting to establish a Wi-Fi P2P connection therewith. In response, the advertiser 110-*e* may send an acknowledgement 725 to the seeker 105-*d* indicating that it agrees to the request and/or has implemented any configuration changes or the like to enable the requested connection, and the connection may be established. While only two communication messages 720, 725 are shown, those skilled in the art will appreciate that numerous messages are involved to establish a Wi-Fi P2P connection, and that the two messages shown are only representative of the communications that may take place in practice. The seeker 105-*d* and the advertiser 110-*e* may then communicate via the Wi-Fi P2P connection to provide the service(s) 730 as determined via the probe 705 and the probe response 710.

Figure 8:
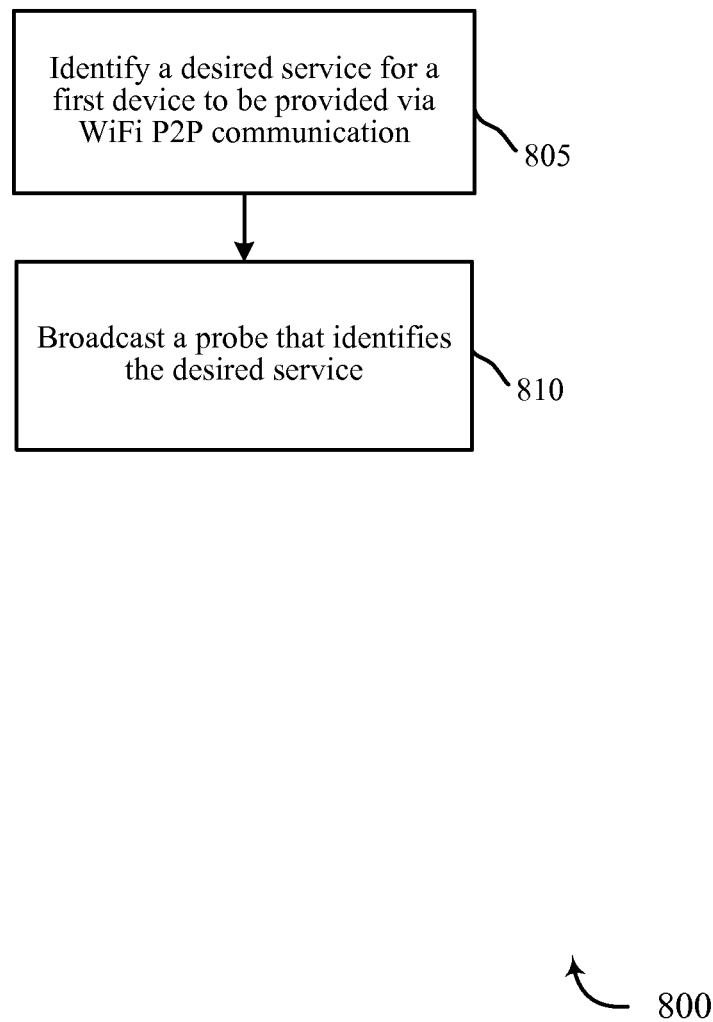
FIG. 8 is a flow chart illustrating an embodiment of a method for Wi-Fi P2P communication that may be performed by a seeker.

FIG. 8 is a flow chart illustrating an embodiment of a method 800 performed by a seeker for Wi-Fi P2P communication, such as for obtaining services thereby. For clarity, the method 800 is described below with reference to the wireless communications system 100 shown in FIG. 1, and/or with reference to one of the seekers 105 described with reference to FIGS. 1, 2, 3A, 3B, 6 and/or 7. In one implementation, the seeker communications management module 210 described with reference to FIGS. 2, 3A, 3B and/or 6 may execute one or more sets of codes to control the functional elements of a seeker 105 to perform the functions described below.

In one embodiment, at block 805, the seeker 105 may identify a desired service to be provided via Wi-Fi P2P communication. At block 810, the seeker 105 may broadcast a probe that identifies the desired service.

Therefore, the method 800 may be used to facilitate a service discovery process before a Wi-Fi P2P connection or other connection is established between the seeker 105 and one or more advertisers that may provide the desired service. Thus, the seeker 105 does not need perform a discovery process and then perform a separate process for obtaining the desired service. It should be noted that the method 800 is just one implementation and that other implementations are possible.

Figure 9:
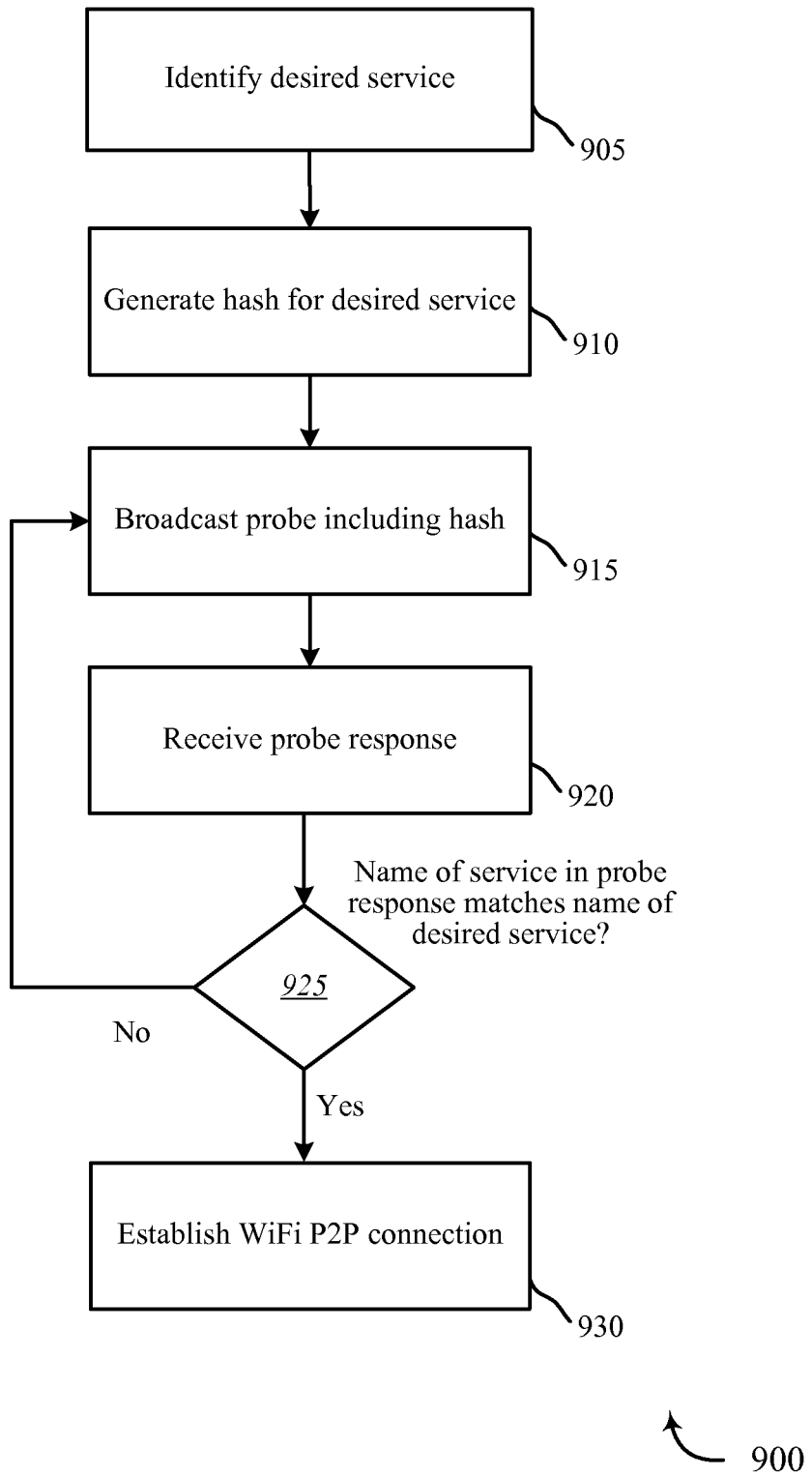
FIG. 9 is a flow chart illustrating another embodiment of a method for Wi-Fi P2P communication that may be performed by a seeker.

FIG. 9 is a flow chart illustrating another embodiment of a method 900 performed by a seeker for Wi-Fi P2P communication, such as for obtaining services thereby. For clarity, the method 900 is described below with reference to the wireless communications system 100 shown in FIG. 1, and/or with reference to one of the seekers 105 described with reference to FIGS. 1, 2, 3A, 3B, 6 and/or 7. In one implementation, the seeker communications management module 210 described with reference to FIGS. 2, 3A, 3B and/or 6 may execute one or more sets of codes to control the functional elements of a seeker 105 to perform the functions described below.

At block 905, the seeker 105 may identify a desired service to be provided via Wi-Fi P2P communication. At block 910, the seeker 105 may generate a hash for the desired service. The seeker 105 may then broadcast a probe that identifies the desired service by including the hash value in the probe, at block 915.

Next, at block 920, the seeker 105 may receive a probe response from an advertiser. It should be understood that the seeker 105 may receive probe responses from multiple advertisers, or may not receive any response to its probe. If no response is received, the seeker 105 may try again (e.g., re-broadcast the probe) and/or may change its location and retry. The case of receiving responses from multiple advertisers is not illustrated for the sake of clarity and brevity.

Once a probe response is received, the seeker 105 may determine whether the name of the service included in the probe response (corresponding to the service that the advertiser is capable of providing to address the desired service) matches the name of the desired service, at block 925. If there is a match, the seeker 105 may communicate further with the advertiser to establish a Wi-Fi P2P connection via which the seeker 105 may obtain the desired service from the advertiser, at block 930. If there is not a match, the method may return to block 915 to rebroadcast the probe. Alternatively, the method may end without successfully discovering an advertiser that is capable of providing the desired service.

Therefore, the method 900 may be used to facilitate a service discovery process before a Wi-Fi P2P connection or other connection is established between the seeker 105 and one or more advertisers that may provide the desired service. The method 900 may include using a hash value in the probe to utilize the limited payload of the probe. Thus, the seeker 105 may efficiently perform a service discovery process and establish a Wi-Fi P2P connection for obtaining the desired service based on a result of the service discovery process. It should be noted that the method 900 is just one implementation and that other implementations are possible. For example, the operations of the method 900 may be combined with the operations of the method 800 described with respect to FIG. 8. Further, the operations may be rearranged and/or modified as appropriate or desired.

Figure 10:
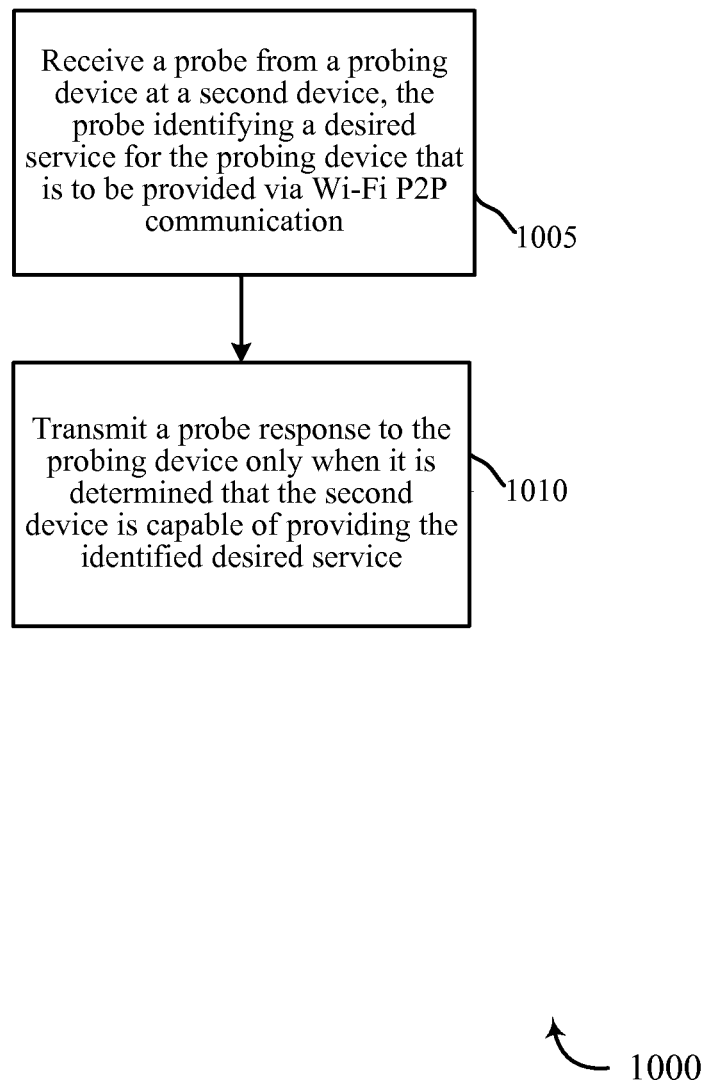
FIG. 10 is a flow chart illustrating an embodiment of a method for Wi-Fi P2P communication that may be performed by an advertiser.

FIG. 10 is a flow chart illustrating an embodiment of a method 1000 performed by an advertiser for Wi-Fi P2P communication, such as for providing services to a seeker thereby. For clarity, the method 1000 is described below with reference to the wireless communications system 100 shown in FIG. 1, and/or with reference to one of the advertisers 110 described with reference to FIGS. 1, 4, 5A, 5B, 6 and/or 7. In one implementation, the advertiser communications management module 410 described with reference to FIGS. 4, 5A, 5B and/or 6 may execute one or more sets of codes to control the functional elements of an advertiser 110 to perform the functions described below.

At block 1005, the advertiser 110 may receive a probe from a probing user equipment (UE), e.g., a seeker. The received probe may identify a desired service for the probing UE that is to be provided via Wi-Fi P2P communication. Next, at block 1010, the advertiser 110 may transmit a probe response to the probing UE. The advertiser 110 may transmit the probe response only if the advertiser 110 is capable of providing a service corresponding to the desired service identified by the probe.

Therefore, the method 1000 may be used to facilitate a service discovery process before a Wi-Fi P2P connection or other connection is established. The advertiser 110 does not need to respond to all probes, but may respond only to probes that identify a desired service that the advertiser 110 is configured to perform. It should be noted that the method 1000 is just one implementation and that other implementations are possible.

Figure 11:
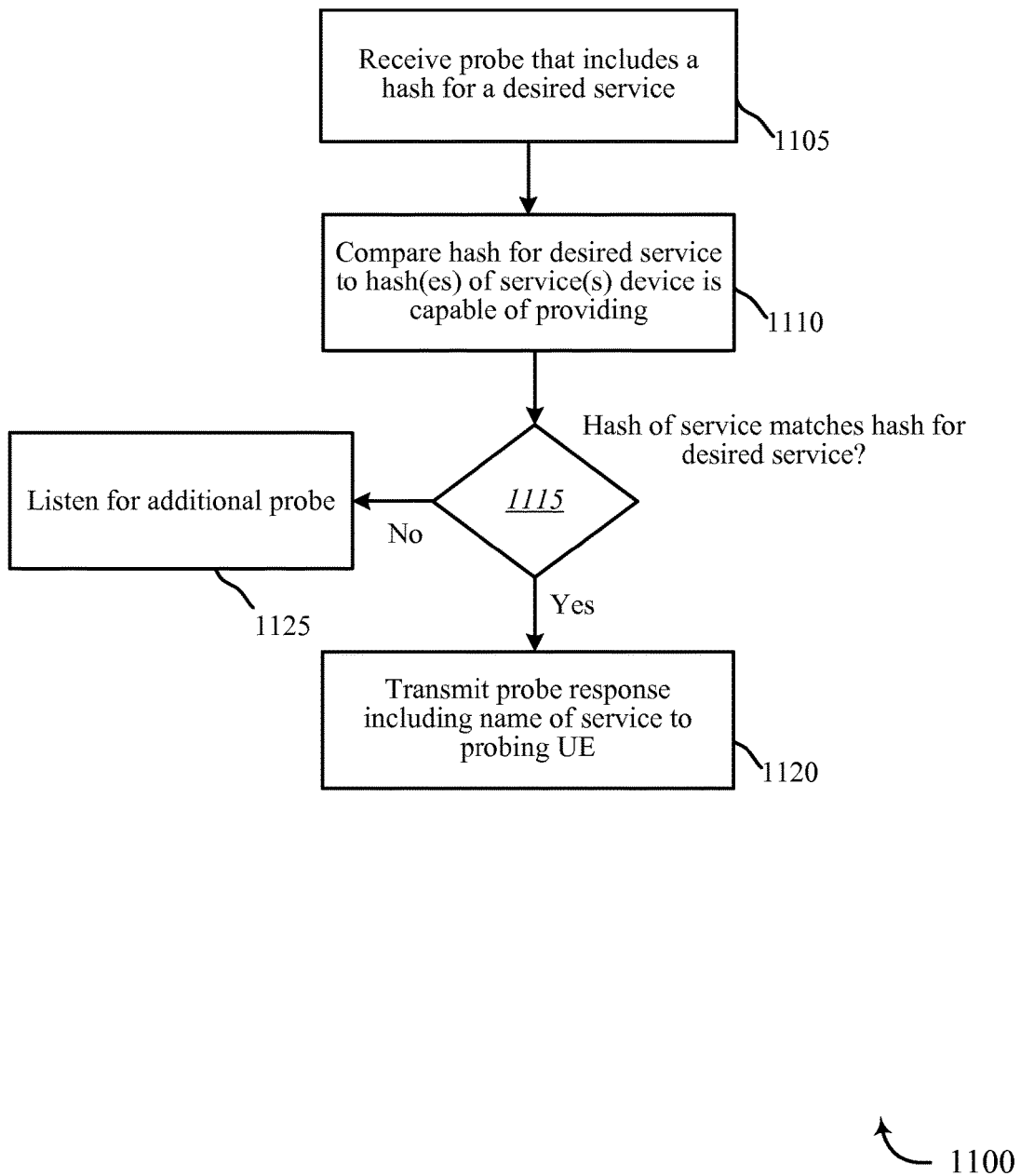
FIG. 11 is a flow chart illustrating another embodiment of a method for Wi-Fi P2P communication that may be performed by an advertiser.

FIG. 11 is a flow chart illustrating another embodiment of a method 1100 performed by an advertiser for Wi-Fi P2P communication, such as for providing services to a seeker thereby. For clarity, the method 1100 is described below with reference to the wireless communications system 100 shown in FIG. 1, and/or with reference to one of the advertisers 110 described with reference to FIGS. 1, 4, 5A, 5B, 6 and/or 7. In one implementation, the advertiser communications management module 410 described with reference to FIGS. 4, 5A, 5B and/or 6 may execute one or more sets of codes to control the functional elements of an advertiser 110 to perform the functions described below.

At block 1105, the advertiser 110 may receive a probe from a probing UE. The received probe may identify a desired service for the probing UE that is to be provided via Wi-Fi P2P communication. In this example, the received probe may include a hash or hash value for the desired service. The hash value may have been generated by the probing UE (i.e., a seeker) by hashing the name of the desired service, for example. Next, at block 1110, the advertiser 110 may compare the hash for the desired service with hashes or hash values corresponding to the service(s) the advertiser 110 is capable of providing. The hash value(s) may have been generated by the advertiser 110 by hashing the name(s) of the service(s) the advertiser 110 is capable of providing. Based on the comparison, the advertiser 110 may determine, at block 1115, whether the hash or hash value of a service the advertiser 110 is capable of providing matches the hash or hash value of the desired service. If so, then the advertiser 110 may transmit a probe response to the probing UE at block 1120. The advertiser 110 may include the name of the service that it may provide in the probe response. Further, the advertiser 110 may transmit the probe response only if the advertiser 110 is capable of providing a service corresponding to the desired service identified by the probe.

Thus, when the advertiser 110 is not capable of providing the desired service, at block 1125 the advertiser 110 may continue with whatever function or operation it may otherwise be performing (e.g., listen, idle, etc.).

Therefore, the method 1100 may be used to facilitate a service discovery process before a Wi-Fi P2P connection or other connection is established. The advertiser 110 does not need to respond to all probes, but may respond only to probes that identify a desired service that the advertiser 110 is configured to perform. It should be noted that the method 1100 is just one implementation and that other implementations are possible. For example, the operations of the method 1100 may be combined with the operations of the method 1000 described with respect to FIG. 10. Further, the operations may be rearranged and/or modified as appropriate or desired.

Figure 12:
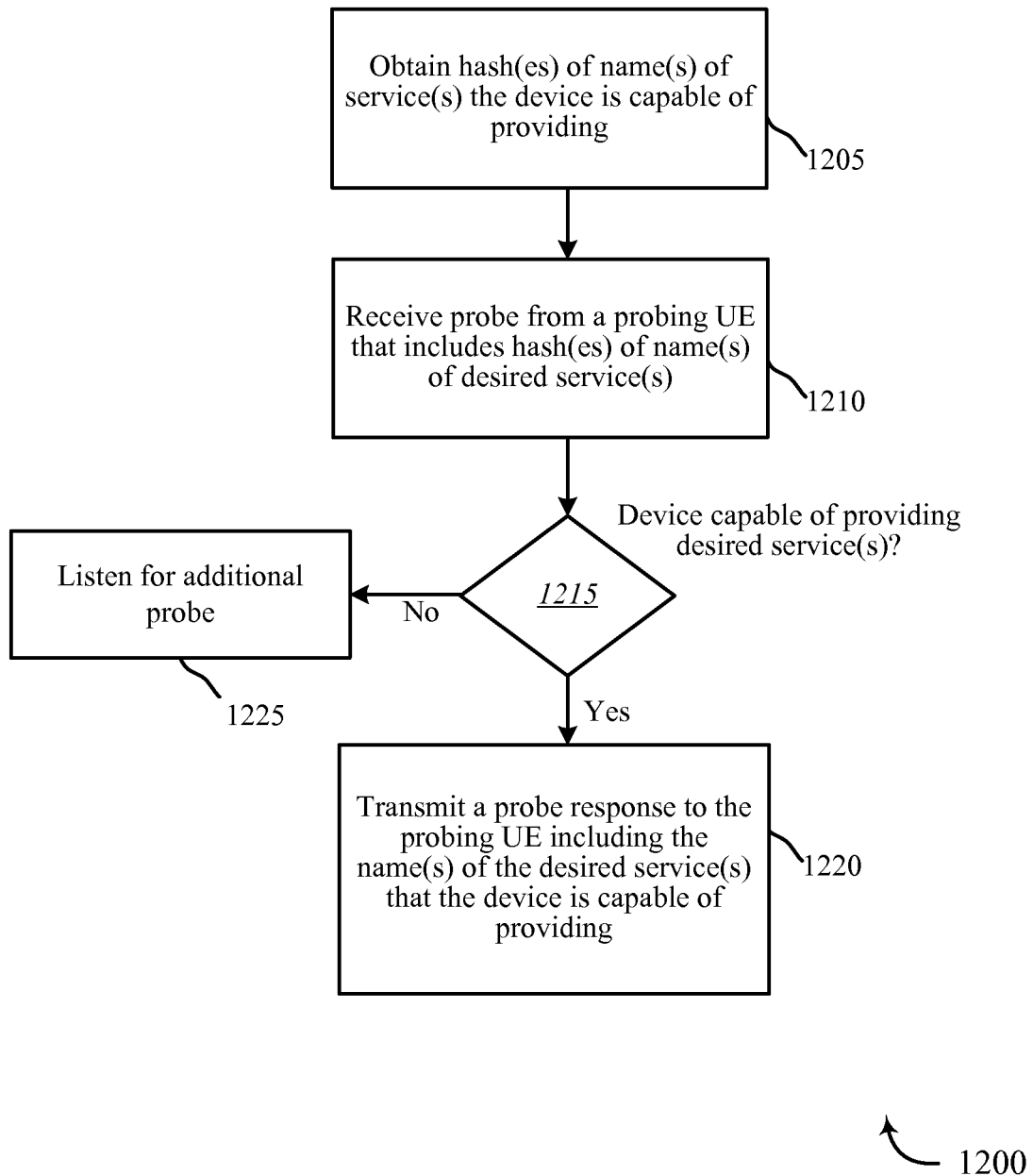
FIG. 12 is a flow chart illustrating a further embodiment of a method for Wi-Fi P2P communication that may be performed by an advertiser.

FIG. 12 is a flow chart illustrating a further embodiment of a method 1200 performed by an advertiser for Wi-Fi P2P communication, such as for providing services to a seeker thereby. For clarity, the method 1200 is described below with reference to the wireless communications system 100 shown in FIG. 1, and/or with reference to one of the advertisers 110 described with reference to FIGS. 1, 4, 5A, 5B, 6 and/or 7. In one implementation, the advertiser communications management module 410 described with reference to FIGS. 4, 5A, 5B and/or 6 may execute one or more sets of codes to control the functional elements of an advertiser 110 to perform the functions described below.

At block 1205, the advertiser 110 may obtain hashes by hashing the name(s) of the service(s) that the advertiser 110 is capable of providing. Next, at block 1210, the advertiser 110 may receive a probe from a probing UE that includes hashes generated by hashing the name(s) of service(s) desired by the probing UE. At block 1215, the advertiser 110 may determine whether the advertiser 110 is capable of providing the desired service(s), for example, using the hash(es) for the service(s) that the advertiser 110 is capable of providing and the hash(es) of the desired service(s). If so, then at block 1220 the advertiser 110 may transmit a probe response including the name(s) of the service(s) it may provide to the probing UE. The advertiser 110 may transmit the probe response only if the advertiser 110 is capable of providing a service corresponding to the desired service identified by the probe. Thus, when the advertiser 110 is not capable of providing the desired service, at block 1225 the advertiser 110 may continue with whatever function or operation it may otherwise be performing (e.g., listen, idle, etc.).

Therefore, the method 1200 may be used to facilitate a service discovery process before a Wi-Fi P2P connection or other connection is established. The advertiser 110 does not need to respond to all probes, but may respond only to probes that identify a desired service that the advertiser 110 is configured to perform. It should be noted that the method 1200 is just one implementation and that other implementations are possible. For example, the operations of the method 1200 may be combined with the operations of the method 1000 described with respect to FIG. 10 and/or the method 1100 described with respect to FIG. 11. Further, the operations may be rearranged and/or modified as appropriate or desired.

The detailed description set forth above in connection with the appended drawings describes exemplary embodiments and does not represent the only embodiments that may be implemented or that are within the scope of the claims. The term "exemplary" used throughout this description means "serving as an example, instance, or illustration,"

and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Throughout this disclosure the term "example" or "exemplary" indicates an example or instance and does not imply or require any preference for the noted example. Thus, the disclosure is not to be limited to the examples and designs described herein but is to be accorded the broadest scope consistent with the principles and novel features disclosed herein.

What is claimed is:

1. A method for Wi-Fi peer-to-peer (P2P) communication, comprising:
   determining a size of a hash of a first identifier corresponding to a desired service based at least in part on an available payload of a discovery probe, the desired service to be provided via Wi-Fi P2P communication;
   generating the hash of the first identifier in accordance with the determined size;
   including the hash in the discovery probe to identify the desired service;
   broadcasting, by a seeker device, the discovery probe that identifies the desired service;
   receiving, by the seeker device, a discovery probe response from at least one second device, the discovery probe response including a second identifier corresponding to a service that the at least one second device is capable of providing, the service corresponding to the desired service; and
   acquiring the desired service from the at least one second device based at least in part on receiving the discovery probe response.

2. The method of claim 1, wherein the hash of the first identifier is included in an information element (IE) of the discovery probe.

3. The method of claim 1, wherein the first identifier comprises a name of the desired service.

4. The method of claim 1, further comprising:
   determining if the second identifier matches the first identifier.

5. The method of claim 4, further comprising:
   providing a notification of a match when it is determined that the second identifier matches the first identifier.

6. The method of claim 5, wherein providing the notification includes providing the notification to a user via a user interface of the seeker device.

7. The method of claim 5, wherein providing the notification includes providing the notification to the seeker device via an application.

8. The method of claim 5, wherein the provided notification includes information regarding the at least one second device.

9. The method of claim 1, wherein the second identifier is included in an information element (IE) of the discovery probe response.

10. The method of claim 1, wherein the second identifier comprises a name of the service that the at least one second device is capable of providing.

11. An apparatus for Wi-Fi peer-to-peer (P2P) communication, comprising:
   means for generating a hash of a first identifier corresponding to a desired service based at least in part on an available payload of a discovery probe, the desired service to be provided via Wi-Fi P2P communication;
   means for broadcasting a discovery probe that identifies the desired service by including the hash in the discovery probe;
   means for receiving a discovery probe response from at least one second device, the discovery probe response including a second identifier corresponding to a service that the at least one second device is capable of providing, the service corresponding to the desired service; and
   means for acquiring the desired service from the at least one second device based at least in part on receiving the discovery probe response.

12. The apparatus of claim 11, wherein the hash of the first identifier is included in an information element (IE) of the discovery probe.

13. The apparatus of claim 11, wherein the first identifier comprises a name of the desired service.

14. The apparatus of claim 11, further comprising:
   means for determining if the second identifier matches the first identifier.

15. The apparatus of claim 14, further comprising:
   means for providing a notification of a match when it is determined that the second identifier matches the first identifier.

16. The apparatus of claim 15, wherein the means for providing the notification is configured to provide the notification to a user via a user interface.

17. The apparatus of claim 15, wherein the means for providing the notification is configured to provide the notification via an application.

18. The apparatus of claim 11, wherein the second identifier is included in an information element (IE) of the discovery probe response.

19. The apparatus of claim 11, wherein the second identifier comprises a name of the service that the at least one second device is capable of providing.

20. A user equipment (UE) for Wi-Fi peer-to-peer (P2P) communication, comprising:
   at least one processor;
   a memory in electronic communication with the at least one processor; and
   instructions stored in the memory, the instructions being executable by the at least one processor to:
   determine a size of a hash of a first identifier corresponding to a desired service based at least in part on an available payload of a discovery probe, the desired service to be provided via Wi-Fi P2P communication;
   generate the hash of the first identifier in accordance with the determined size;
   include the hash in the discovery probe to identify the desired service;
   broadcast the discovery probe that identifies the desired service;
   receive a discovery probe response from at least one second device, the discovery probe response including a second identifier corresponding to a service that the at least one second device is capable of providing, the service corresponding to the desired service; and
   acquire the desired service from the at least one second device based at least in part on receiving the discovery probe response.

21. The UE of claim 20, wherein the hash of the first identifier is included in an information element (IE) of the discovery probe.

22. The UE of claim 20, wherein the first identifier comprises a name of the desired service.

23. The UE of claim 20, wherein the instructions are executable by the processor to:
   determine if the second identifier matches the first identifier.

24. The UE of claim 23, wherein the instructions are executable by the processor to:
   provide a notification of a match when it is determined that the second identifier matches the first identifier.

25. The UE of claim 24, wherein the notification is provided to a user via a user interface.

26. The UE of claim 24, wherein the notification is provided via an application.

27. The UE of claim 24, wherein the provided notification includes information regarding the at least one second device.

28. The UE of claim 20, wherein the second identifier is included in an information element (IE) of the discovery probe response.

29. The UE of claim 20, wherein the second identifier comprises a name of the service that the at least one second device is capable of providing.

30. A computer program product for Wi-Fi peer-to-peer (P2P) communication, the computer program product comprising a non-transitory computer-readable medium storing instructions executable by a processor to:
   determine a size of a hash of a first identifier corresponding to a desired service based at least in part on an available payload of a discovery probe, the desired service to be provided via Wi-Fi P2P communication;
   generate the hash of the first identifier in accordance with the determined size;
   include the hash in the discovery probe to identify the desired service;
   broadcast the discovery probe that identifies the desired service;
   receive a discovery probe response from at least one second device, the discovery probe response including a second identifier corresponding to a service that the at least one second device is capable of providing, the service corresponding to the desired service; and
   acquire the desired service from the at least one second device based at least in part on receiving the discovery probe response.

31. The computer program product of claim 30, wherein the instructions are executable by the processor to:
   determine if the second identifier matches the first identifier.

32. The computer program product of claim 31, wherein the instructions are executable by the processor to:
   provide a notification of a match when it is determined that the second identifier matches the first identifier.

33. The computer program product of claim 32, wherein the notification is provided to a user via a user interface.

34. The computer program product of claim 32, wherein the notification is provided via an application.

35. The computer program product of claim 32, wherein the provided notification includes information regarding the at least one second device.

36. The computer program product of claim 30, wherein the hash of the first identifier is included in an information element (IE) of the discovery probe.

37. The computer program product of claim 30, wherein the first identifier comprises a name of the desired service.

38. The computer program product of claim 30, wherein the second identifier is included in an information element (IE) of the discovery probe response.

39. The computer program product of claim 30, wherein the second identifier comprises a name of the service that the at least one second device is capable of providing.

* * * * *